United States Patent
Wang et al.

(10) Patent No.: US 11,362,884 B2
(45) Date of Patent: Jun. 14, 2022

(54) FAULT ROOT CAUSE DETERMINING METHOD AND APPARATUS, AND COMPUTER STORAGE MEDIUM

(71) Applicant: Huawei Technologies Co., Ltd., Shenzhen (CN)

(72) Inventors: Zhongyu Wang, Nanjing (CN); Yuming Xie, Nanjing (CN); Zhenwei Zhang, Nanjing (CN); Yunpeng Gao, Nanjing (CN); Xin Xiao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/106,915

(22) Filed: Nov. 30, 2020

(65) Prior Publication Data
US 2021/0168021 A1 Jun. 3, 2021

(30) Foreign Application Priority Data
Nov. 30, 2019 (CN) .......................... 201911208147.9

(51) Int. Cl.
*H04L 41/0631* (2022.01)
*G06K 9/62* (2022.01)
*H04L 41/0604* (2022.01)

(52) U.S. Cl.
CPC ........ *H04L 41/0631* (2013.01); *G06K 9/6256* (2013.01); *G06K 9/6276* (2013.01); *H04L 41/0627* (2013.01)

(58) Field of Classification Search
CPC ............ H04L 41/0631; H04L 41/0627; G06K 9/6256; G06K 9/6276
(Continued)

(56) References Cited

U.S. PATENT DOCUMENTS 6,393,386 B1 * 5/2002 Zager .................. H04L 41/0233
370/254
10,594,542 B2 * 3/2020 Jeyakumar ............. G06N 20/00
(Continued)

FOREIGN PATENT DOCUMENTS

CN 107171819 A 9/2017
JP 2002271328 A 9/2002
(Continued)

OTHER PUBLICATIONS

Q. Wang, Z. Mao, B. Wang and L. Guo, "Knowledge Graph Embedding: A Survey of Approaches and Applications," in IEEE Transactions on Knowledge and Data Engineering, vol. 29, No. 12, pp. 2724-2743, Dec. 1, 2017, doi: 10.1109/TKDE.2017.2754499. (Year: 2017).*
(Continued)

*Primary Examiner* — Melvin H Pollack
(74) *Attorney, Agent, or Firm* — Conley Rose, P.C.

(57) ABSTRACT

In a fault root cause determining method, a management device obtains a fault feature of a target network in which a fault occurs. The fault feature is determined based on a knowledge graph of the target network in which the fault occurs. The knowledge graph includes a network entity and an abnormal event entity. The abnormal event entity is connected to an abnormal network entity. The abnormal network entity is a network entity that generates an abnormal event in the target network. The abnormal event entity is configured to indicate the abnormal event generated by the abnormal network entity. A type of the network entity is a network device, an interface, a protocol, or a service. The management device determines a fault root cause of the target network based on the fault feature.

23 Claims, 6 Drawing Sheets

(58) Field of Classification Search
USPC .......................................................... 709/224
See application file for complete search history.

(56) References Cited

U.S. PATENT DOCUMENTS

| | | | |
|---|---|---|---|
| 10,616,043 B2* | 4/2020 | Wang | H04L 41/12 |
| 10,637,715 B1* | 4/2020 | Vasilyev | H04L 41/0816 |
| 10,666,494 B2* | 5/2020 | Zafer | H04L 41/069 |
| 10,679,007 B2* | 6/2020 | Jia | G06F 40/295 |
| 10,679,133 B1* | 6/2020 | Mathur | G06N 5/046 |
| 10,708,152 B2* | 7/2020 | Kulshreshtha | H04L 43/0852 |
| 10,749,883 B1* | 8/2020 | Martin | G06F 21/554 |
| 10,761,921 B2* | 9/2020 | Cheriton | G06F 11/0793 |
| 10,776,409 B2* | 9/2020 | Dubyak | G06F 16/3331 |
| 10,805,171 B1* | 10/2020 | Anwer | H04L 41/0893 |
| 10,812,318 B2* | 10/2020 | Tammana | H04L 41/064 |
| 10,860,410 B2* | 12/2020 | Jeong | G06F 11/0769 |
| 10,873,794 B2* | 12/2020 | Kulshreshtha | H04L 43/04 |
| 10,902,062 B1* | 1/2021 | Guha | G06N 5/003 |
| 10,915,435 B2* | 2/2021 | Zhang | G06F 8/75 |
| 10,942,919 B2* | 3/2021 | Williams | G06F 16/24575 |
| 10,977,574 B2* | 4/2021 | Goloubew | G06N 7/005 |
| 11,011,183 B2* | 5/2021 | Shao | G10L 15/22 |
| 11,017,572 B2* | 5/2021 | Lee | G06N 7/005 |
| 11,082,287 B2* | 8/2021 | Qian | H04L 63/20 |
| 11,082,434 B2* | 8/2021 | Ravindra | G06F 16/258 |
| 11,106,442 B1* | 8/2021 | Hsiao | G06F 11/3419 |
| 11,115,432 B2* | 9/2021 | Singh | H04L 41/0253 |
| 11,126,493 B2* | 9/2021 | Guha | G06N 5/022 |
| 2005/0216785 A1 | 9/2005 | Suzuki et al. | |
| 2009/0055684 A1 | 2/2009 | Jamjoom et al. | |
| 2012/0005533 A1 | 1/2012 | Li et al. | |
| 2015/0170037 A1 | 6/2015 | Lvin | |
| 2015/0280968 A1 | 10/2015 | Gates et al. | |
| 2019/0163551 A1 | 5/2019 | Cheriton | |
| 2019/0286504 A1 | 9/2019 | Muntes-Mulero et al. | |
| 2019/0384255 A1* | 12/2019 | Krishnaswamy | G05B 19/4063 |
| 2020/0012549 A1* | 1/2020 | Johnsson | G06N 3/088 |
| 2020/0111009 A1* | 4/2020 | Chattopadhyay | G06N 5/022 |
| 2020/0136891 A1* | 4/2020 | Mdini | H04L 43/16 |
| 2020/0175406 A1* | 6/2020 | Song | G06N 5/022 |
| 2020/0259700 A1* | 8/2020 | Bhalla | H04L 41/0823 |
| 2020/0293917 A1* | 9/2020 | Wang | G06N 20/00 |
| 2020/0311134 A1* | 10/2020 | Reddy | G06F 16/9024 |
| 2021/0011890 A1* | 1/2021 | Mdini | G06F 16/212 |
| 2021/0029003 A1* | 1/2021 | Morman | H04L 41/046 |
| 2021/0056487 A1* | 2/2021 | Boyle | G06Q 10/06393 |
| 2021/0075805 A1* | 3/2021 | Cavallari | G06F 21/552 |
| 2021/0103807 A1* | 4/2021 | Baker | G06N 3/04 |
| 2021/0141900 A1* | 5/2021 | Brown | G06F 21/566 |
| 2021/0194909 A1* | 6/2021 | Tang | G06F 21/55 |
| 2021/0256030 A1* | 8/2021 | Zhang | G06F 17/10 |
| 2021/0271582 A1* | 9/2021 | Liu | G06F 11/3428 |

FOREIGN PATENT DOCUMENTS

| | | |
|---|---|---|
| JP | 2005252765 A | 9/2005 |
| JP | 2005269238 A | 9/2005 |
| WO | 2017109903 A1 | 6/2017 |

OTHER PUBLICATIONS

Hodge, V., Austin, J. A Survey of Outlier Detection Methodologies. Artificial Intelligence Review 22, 85-126 (2004). https://doi.org/10.1023/B:AIRE.0000045502.10941.a9 (Year: 2004).*

Darren Mutz, Fredrik Valeur, Giovanni Vigna, and Christopher Kruegel. 2006. Anomalous system call detection. <i>ACM Trans. Inf. Syst. Secur.</i> 9, (Feb. 1, 2006), 61-93. DOI:https://doi.org/10.1145/1127345.1127348 (Year: 2006).*

Felix Salfner, Maren Lenk, and Miroslaw Malek. 2010. A survey of online failure prediction methods. <i>ACM Comput. Surv.</i> 42, 3, Article 10 (Mar. 2010), 42 pages. DOI:https://doi.org/10.1145/1670679.1670680 (Year: 2010).*

Eng Keong Lua, J. Crowcroft, M. Pias, R. Sharma and S. Lim, "A survey and comparison of peer-to-peer overlay network schemes," in IEEE Communications Surveys & Tutorials, vol. 7, No. 2, pp. 72-93, Second Quarter 2005, doi: 10.1109/COMST.2005.1610546. (Year: 2005).*

* cited by examiner

FAULT ROOT CAUSE DETERMINING METHOD AND APPARATUS, AND COMPUTER STORAGE MEDIUM

CROSS-REFERENCE TO RELATED APPLICATIONS

This claims priority to Chinese Patent App. No. 201911208147.9, filed on Nov. 30, 2019, which is incorporated by reference.

FIELD

This disclosure relates to the field of network technologies, and in particular, to a fault root cause determining method and apparatus, and a computer storage medium.

BACKGROUND

A fault cause in a current network is relatively complex. For example, in a data center network (DCN), an Address Resolution Protocol (ARP) entry overrun, a device restart, a router identity conflict, or the like may cause a network fault. Therefore, it is difficult to locate a network fault.

Currently, a manner of determining, by using a fault tree, a root cause of a fault ("fault root cause") that occurs in a network is proposed. In a rule-based fault tree, one root cause determining rule may correspond to one fault root cause. When performance of network data obtained in a fault scenario meets a root cause determining rule, it may be determined that a fault root cause that causes the fault scenario is a fault root cause corresponding to the root cause determining rule. A root cause determining rule may be a combination of a plurality of single rules through an AND gate and an OR gate.

However, a current fault tree is usually constructed according to a fault propagation rule of a single device, and a fault may be propagated between different devices in an actual network. In this case, the fault tree cannot accurately locate a fault root cause in the network. Therefore, using the fault tree to locate the fault root cause in the network is low in accuracy.

SUMMARY

This disclosure provides a fault root cause determining method and apparatus, and a computer storage medium, to resolve a problem of relatively low accuracy of fault root cause locating in a current network.

According to a first aspect, a method for determining a fault root cause is provided. The method includes: obtaining, by a management device, a fault feature of a target network in which a fault occurs, where the fault feature is determined based on a knowledge graph of the target network in which the fault occurs, the knowledge graph includes a network entity and an abnormal event entity, the abnormal event entity is connected to an abnormal network entity, the abnormal network entity is a network entity that generates an abnormal event in the target network, the abnormal event entity is configured to indicate the abnormal event generated by the abnormal network entity, and a type of the network entity is a network device, an interface, a protocol, or a service; and determining, by the management device, a fault root cause of the target network based on the fault feature.

The fault feature of the network in which the fault occurs is determined based on the knowledge graph of the network in which the fault occurs. Because the knowledge graph is generated based on an entire network, and the obtained fault feature of the network is also based on the entire network, when the fault root cause of the network is determined based on the fault feature of the network, fault propagation between devices can be considered. This improves accuracy of determining the fault root cause in the network.

Optionally, an implementation process of the determining, by the management device, a fault root cause of the target network based on the fault feature includes: inputting, by the management device, the fault feature into a fault root cause inference model, to obtain the fault root cause of the target network that is output by the fault root cause inference model based on the fault feature, where the fault root cause inference model is obtained through training based on a plurality of knowledge graph samples of known fault root causes.

The fault root cause inference model that is obtained through training based on the plurality of knowledge graph samples of the known fault root causes is used to determine the fault root cause of the network, to accurately determine the fault root cause in the network, and prevent an abnormality representation of the fault root cause in the network from being determined as the fault root cause, and further improve accuracy of determining the fault root cause in the network.

Optionally, an implementation process of the obtaining, by a management device, a fault feature of a target network in which a fault occurs includes: obtaining, by the management device, the knowledge graph of the target network in which the fault occurs; and determining, by the management device, the fault feature of the target network based on the knowledge graph.

Optionally, an implementation process of the determining, by the management device, the fault feature of the target network based on the knowledge graph includes: determining, by the management device, a fault matching degree between the knowledge graph and a fault propagation relationship library based on a matching degree between the knowledge graph and each fault propagation relationship in the fault propagation relationship library; and/or for each abnormal network entity on the knowledge graph, obtaining, by the management device, a neighbor network entity of the abnormal network entity, to obtain a neighbor network entity feature corresponding to the abnormal network entity; and/or for each abnormal event entity on the knowledge graph, obtaining, by the management device from the knowledge graph, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer.

The fault feature of the target network includes: the fault matching degree between the knowledge graph of the target network and the fault propagation relationship library, the neighbor network entity feature corresponding to each abnormal network entity on the knowledge graph of the target network, and/or the neighbor abnormal event entity feature corresponding to each abnormal event entity on the knowledge graph of the target network.

Optionally, the method further includes: obtaining, by the management device, the plurality of knowledge graph samples of the known fault root cause, where each of the knowledge graph samples identifies, when a fault occurs in a network to which the knowledge graph sample belongs, all abnormal network entities that generate abnormal events in the network to which the knowledge graph sample belongs and the abnormal event entity used to indicate the abnormal event generated by the abnormal network entity; determining, by the management device, based on the plurality of knowledge graph samples, a fault feature of the network to which each of the knowledge graph samples belongs; and obtaining, by the management device, the fault root cause inference model through training based on the fault feature of the network to which each of the knowledge graph samples belongs and a fault root cause corresponding to each of the knowledge graph samples.

Optionally, an implementation process of the determining, by the management device, based on the plurality of knowledge graph samples, a fault feature of the network to which each of the knowledge graph samples belongs includes: for each of the knowledge graph samples: determining, by the management device, a fault matching degree between the knowledge graph sample and a fault propagation relationship library based on a matching degree between the knowledge graph sample and each fault propagation relationship in the fault propagation relationship library; and/or for each abnormal network entity on the knowledge graph sample, obtaining, by the management device, a neighbor network entity of the abnormal network entity, to obtain a neighbor network entity feature corresponding to the abnormal network entity; and/or for each abnormal event entity on the knowledge graph sample, obtaining, by the management device, from the knowledge graph sample, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer.

Optionally, each of the knowledge graph samples corresponds to a fault root cause.

According to a second aspect, a fault root cause determining method is provided. The method includes: obtaining, by a management device, a knowledge graph of a target network in which a fault occurs, where the knowledge graph includes a network entity and an abnormal event entity, the abnormal event entity is connected to an abnormal network entity, the abnormal network entity is a network entity that generates an abnormal event in the target network, the abnormal event entity is configured to indicate the abnormal event generated by the abnormal network entity, and a type of the network entity is a network device, an interface, a protocol, or a service; and determining, by the management device, a fault feature of the target network based on the knowledge graph, where the fault feature is used to determine a fault root cause of the target network.

Optionally, an implementation process of the determining, by the management device, a fault feature of the target network based on the knowledge graph includes: determining, by the management device, a fault matching degree between the knowledge graph and a fault propagation relationship library based on a matching degree between the knowledge graph and each fault propagation relationship in the fault propagation relationship library; and/or for each abnormal network entity on the knowledge graph, obtaining, by the management device, a neighbor network entity of the abnormal network entity, to obtain a neighbor network entity feature corresponding to the abnormal network entity; and/or for each abnormal event entity on the knowledge graph, obtaining, by the management device from the knowledge graph, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer.

According to a third aspect, a fault root cause determining apparatus is provided. The apparatus includes a plurality of function modules, and the plurality of function modules interact with each other to implement the method in the first aspect and the implementations of the first aspect. The plurality of function modules may be implemented based on software, hardware, or a combination of software and hardware, and the plurality of function modules may be randomly combined or divided based on specific implementation.

According to a fourth aspect, a fault root cause determining apparatus is provided. The apparatus includes a plurality of function modules, and the plurality of function modules interact with each other to implement the method in the second aspect and the implementations of the second aspect. The plurality of function modules may be implemented based on software, hardware, or a combination of software and hardware, and the plurality of function modules may be randomly combined or divided based on specific implementation.

According to a fifth aspect, a fault root cause determining apparatus is provided, including a processor and a memory.

The memory is configured to store a computer program, where the computer program includes a program instruction.

The processor is configured to invoke the computer program to implement the fault root cause determining method in any one of the implementations of the first aspect.

According to a sixth aspect, a fault root cause determining apparatus is provided, including a processor and a memory.

The memory is configured to store a computer program, where the computer program includes a program instruction.

The processor is configured to invoke the computer program to implement the fault root cause determining method in any one of the implementations of the second aspect.

According to a seventh aspect, a computer storage medium is provided. The computer storage medium stores an instruction, and when the instruction is executed by a processor, the fault root cause determining method according to any one of the first aspect or the second aspect is implemented.

According to an eighth aspect, a chip is provided. The chip includes a programmable logic circuit and/or a program instruction. When the chip runs, the method in the first aspect or the second aspect and the implementations of the first aspect or the second aspect is implemented.

The technical solutions provided have at least the following beneficial effects.

The fault feature of the network in which the fault occurs is determined based on the knowledge graph of the network in which the fault occurs. Because the knowledge graph is generated based on an entire network, and the obtained fault feature of the network is also based on the entire network, when the fault root cause of the network is determined based on the fault feature of the network, fault propagation between devices can be considered. This improves accuracy of determining the fault root cause in the network. In addition, the fault root cause inference model that is obtained through training based on the plurality of knowledge graph samples of the known fault root causes is used to determine the fault root cause of the network, to accurately determine the fault root cause in the network, and prevent an abnormality representation of the fault root cause

DETAILED DESCRIPTION

To make the objectives, technical solutions, and advantages clearer, the following further describes the implementations in detail with reference to the accompanying drawings.

Figure 1:
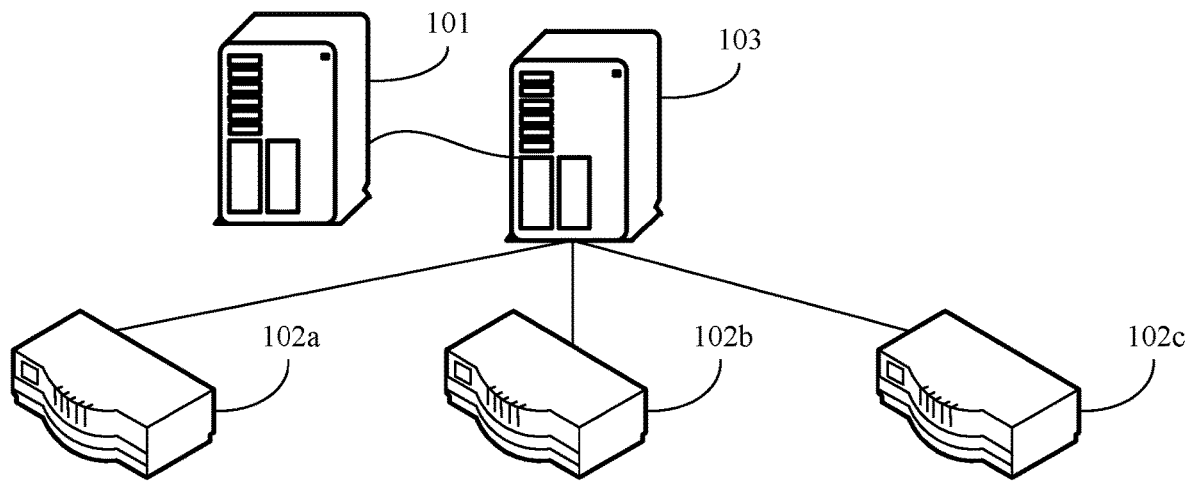
FIG. 1 is a schematic diagram of an application scenario of a fault root cause determining method according to an embodiment.

FIG. 1 is a schematic diagram of an application scenario of a fault root cause determining method according to an embodiment. As shown in FIG. 1, the application scenario includes a management device 101 and network devices 102a to 102c (collectively referred to as "network devices 102") in a communications network. Quantities of management devices and network devices in FIG. 1 are merely used as an example, and are not used as a limitation on an application scenario of the fault root cause determining method provided in this embodiment. The communications network may be a DCN, a metropolitan area network, a wide area network, a campus network, a virtual local area network (VLAN), a virtual extensible local area network (VXLAN), or the like. A type of the communications network is not limited in this embodiment.

Optionally, the management device 101 may be one server, or a server cluster including several servers, or a cloud computing service center. The network device 102 may be a switch, a router, or the like. Optionally, still referring to FIG. 1, the application scenario may further include a control device 103. The control device 103 is configured to manage and control the network device 102 in the communications network. The management device 101 is connected to the control device 103 by using a wired network or a wireless network, and the control device 103 is connected to the network device 102 by using the wired network or the wireless network. The control device 103 may be a network controller, a network management device, a gateway, or another device having a control capability. The control device 103 may be one or more devices.

The control device 103 may store a networking topology of a communications network managed by the control device 103. The control device 103 is further configured to collect device information of the network device 102 in the communications network, an abnormal event generated in the communications network, and the like, and provide the management device 101 with the networking topology of the communications network, device information of the network device 102, the abnormal event generated in the communications network, and the like. The device information of the network device includes network configuration information, a routing entry, and/or the like of the network device. The network configuration information generally includes interface configuration information, protocol configuration information, service configuration information, and the like. Optionally, the control device 103 may periodically collect the device information of the network device 102 and the abnormal event generated in the communications network. For example, the control device may collect, by using a Simple Network Management Protocol (SNMP) or a network telemetry technology, abnormal information of the network device and the abnormal event generated in the communications network. When the device information of the network device 102 changes, the network device 102 actively reports changed device information to the control device 103. When a fault occurs in the communications network, the network device 102 actively reports the generated abnormal event to the control device 103. Certainly, in some application scenarios, the management device may alternatively be directly connected to the network device in the communications network. In other words, the application scenario may not include the control device.

Figure 2:
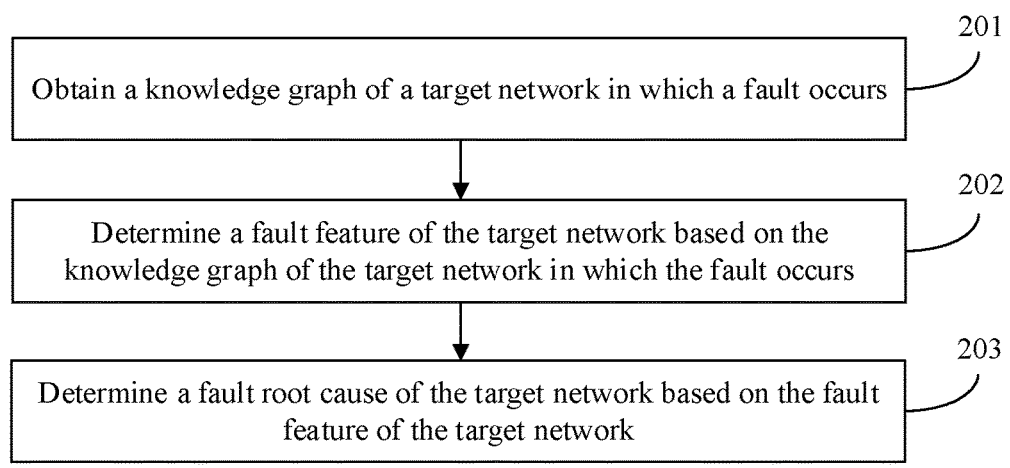
FIG. 2 is a schematic flowchart of a fault root cause determining method according to an embodiment.

FIG. 2 is a schematic flowchart of a fault root cause determining method according to an embodiment. The fault root cause determining method may be applied to the management device 101 in the application scenario shown in FIG. 1. As shown in FIG. 2, the method includes the following steps:

Step 201: Obtain a knowledge graph of a target network in which a fault occurs.

The knowledge graph includes a network entity and an abnormal event entity, the abnormal event entity is connected to an abnormal network entity, the abnormal network entity is a network entity that generates an abnormal event in the target network, the abnormal event entity is configured to indicate the abnormal event generated by the abnormal network entity, and a type of the network entity is a network device, an interface, a protocol, or a service.

Optionally, an implementation process of the step 201 includes:

Step 2011: When a fault occurs in the target network, a management device obtains the abnormal event generated in the target network.

The abnormal event carries an identifier of the network entity that generates the abnormal event. That the fault occurs in the target network refers to that a fault occurs on the network device on the target network. A fault on the network device may be an interface fault, a protocol fault (including a failure to receive or send a protocol packet), a service fault, or the like. Optionally, the abnormal event includes one or more of an alarm log, a status change log, and an abnormal key performance indicator (KPI). The alarm log includes an ID of the abnormal network entity in the network device and an alarm type. The status change log includes configuration file change information and/or routing entry change information. For example, the status change log may include information, for example, "an access sub-interface is deleted" and "a destination IP host route is deleted". The abnormal key performance indicator is used to describe an abnormal indicator of a network entity.

Step 2012: The management device identifies, on an initial knowledge graph of the target network, the abnormal network entity that generates the abnormal event in the target network, and obtains the knowledge graph of the target network in which the fault occurs.

In this embodiment, that the management device identifies, on the initial knowledge graph of the target network, the abnormal network entity that generates the abnormal event in the target network means that the management device adds the abnormal event entity to the initial knowledge graph of the target network, and connects the abnormal event entity to the abnormal network entity that generates the abnormal event indicated by the abnormal event entity.

The initial knowledge graph of the target network is generated based on network data of the target network. The network data of the target network includes a networking topology of the target network and device information of a plurality of network devices in the target network. The device information of the network device includes network configuration information of the network device, and specifically includes one or more of interface configuration information, protocol configuration information, and service configuration information. The device information may further include a routing entry and the like. Optionally, the interface configuration information of the network device includes an Internet Protocol (IP) address of the interface, a protocol type supported by the interface, a service type supported by the interface, and the like. The protocol configuration information of the network device includes an identifier of the protocol. The identifier of the protocol is used to uniquely identify the protocol. The identifier of the protocol may be represented by using a character, a letter, a digit, or the like. The service configuration information of the network device includes a service used by the network device, for example, a virtual private network (VPN) service and/or a Dynamic Host Configuration Protocol (DHCP) service.

Optionally, when the fault occurs in the target network, the management device may further obtain the network data of the target network, extract a plurality of knowledge graph triplets from the network data, and then generate the initial knowledge graph based on the plurality of knowledge graph triplets. Each knowledge graph triplet includes two network entities and a relationship between the two network entities. The relationship between two network entities may be a dependency relationship, a subordinate relationship, a peer relationship, or the like. For example, a relationship between the network device and the interface is a subordinate relationship, in other words, the interface belongs to the network device. For another example, a relationship between two interfaces between which a communication connection is established is the peer relationship.

Optionally, the network entity whose type is a network device in the knowledge graph may be represented by a name of the network device, a media access control (MAC) address, a hardware address, and an open shortest path first (OSPF) router (OsRouter), which may uniquely identify the network device at an OSPF layer, or another identifier that can uniquely identify the network device. The network entity whose type is the interface may be represented by a name of the interface. The network entity whose type is the protocol may be represented by the identifier of the protocol. The knowledge graph triplet is represented by a graph. The knowledge graph triplet includes two basic elements: a point and an edge. The point represents the network entity, and the edge represents a relationship between two network entities, for example, the dependency relationship, the subordinate relationship, or the peer relationship. When the two network entities are in the peer relationship, a non-directional edge may be used to connect the two network entities. When the two network entities are in the dependency relationship or the subordinate relationship, a directional edge (for example, an arrow) may be used to connect the two network entities, and a direction of the edge points from a depending network entity to a depended network entity; or a direction of the edge points from an attaching network entity to an attached network entity.

Optionally, the management device extracts, from the network data based on an abstract service model corresponding to a network type of the target network, structured data (for example, json data) corresponding to the knowledge graph triplet, for example, the structured data may include an OsRouter, a network segment at the OSPF layer (OsNetwork), physical interface information on the network device, OSPF neighbor state change information and state value change information of a Border Gateway Protocol (BGP) state machine. Then, the management device parses and converts the extracted structured data into the knowledge graph triplet. The abstract service model is used to reflect a relationship between different network entities. The different network types may correspond to different abstract service models. The abstract service model is essentially a data object used to define a dependency relationship between the different network entities. For example, it may be defined in the abstract service model that: each network device has one or more interfaces, in other words, the interfaces belong to the network device; the interfaces may carry a forwarding service, for example, the interface may carry a layer 3 IP forwarding service, in other words, the interface supports packet forwarding by using an interior gateway protocol (IGP), in other words, the layer 3 IP forwarding service or the IGP depends on the interface; a VXLAN tunnel, a traffic engineering (TE) tunnel, and the BGP can be carried on the layer 3 IP forwarding service, in other words, the VXLAN tunnel, the TE tunnel, and the BGP depend on the layer 3 IP forwarding service; the VPN service can be carried on the TE tunnel, in other words, the VPN service depends on the TE tunnel; and the like. The VXLAN tunnel may be carried on the layer 3 IP forwarding service, and this represents that an interface carrying the layer 3 IP forwarding service may be used as an endpoint of the VXLAN tunnel. The TE tunnel can be carried on the layer 3 IP forwarding service, and this represents that the interface that carries the layer 3 IP forwarding service can be used as an endpoint of the TE tunnel. The BGP can be carried on the layer 3 IP forwarding service, and this represents that the interface carrying the layer 3 IP forwarding service can send and receive a BGP-based protocol packet. The VPN service can be carried on the TE tunnel, and this represents that the interface that carries the TE tunnel can support the VPN service.

Optionally, the management device may extract the structured data corresponding to the knowledge graph triplet from the network configuration information of the network device, or may extract the structured data corresponding to the knowledge graph triplet based on a routing entry of the network device.

Optionally, the management device may periodically obtain the device information of the network device in the target network, and generate the initial knowledge graph of the target network. After generating the initial knowledge graph of the target network, the management device may further store the initial knowledge graph of the target network in the management device or a storage device connected to the management device for subsequent use. For example, the initial knowledge graph of the target network may be used as a basis for determining a fault propagation relationship between network entities; and/or, the initial knowledge graph of the target network may be used as a basis for fault root cause inference. For example, when the fault occurs in the target network in a period, the management device may identify, on an initial knowledge graph corresponding to the period, the abnormal network entity that generates the abnormal event, and obtain a knowledge graph that identifies the abnormal network entity. This improves efficiency of obtaining the knowledge graph that identifies the abnormal network entity.

For example, it is assumed that the target network includes two network devices: a network device A and a network device B. The network device A has three interfaces, and names of the three interfaces respectively are: 10GE1/0/1, 10GE1/0/2, and 10GE1/0/3. The network device B has four interfaces, and names of the four interfaces respectively are: 10GE3/0/1, 10GE3/0/2, 10GE3/0/3, and 10GE3/0/4. The network device A and the network device B support an OSPF protocol, where the OSPF protocol is the IGP. An identifier of the OSPF protocol on the network device A is respected by 10.89.46.25, and the OSPF protocol on the network device A includes three route IP addresses: 11.11.11.11, 11.11.11.12, and 11.11.11.13. An identifier of the OSPF protocol on the network device B is represented by 10.89.49.37, and the OSPF protocol on the network device B includes four route IP addresses: 11.12.11.11, 11.12.11.12, 11.12.11.13, and 11.12.11.14. The interface 10GE1/0/2 on the network device A is connected to the interface 10GE3/0/2 on the network device B. The two interfaces use the OSPF protocol for communication. The interface 10GE1/0/2 on the network device A uses the route IP address 11.11.11.11. The interface 10GE3/0/2 on the network device B uses the route IP address 11.12.11.14. Therefore, an initial knowledge graph shown in FIG. 3 may be obtained based on the foregoing network data.

Figure 3:
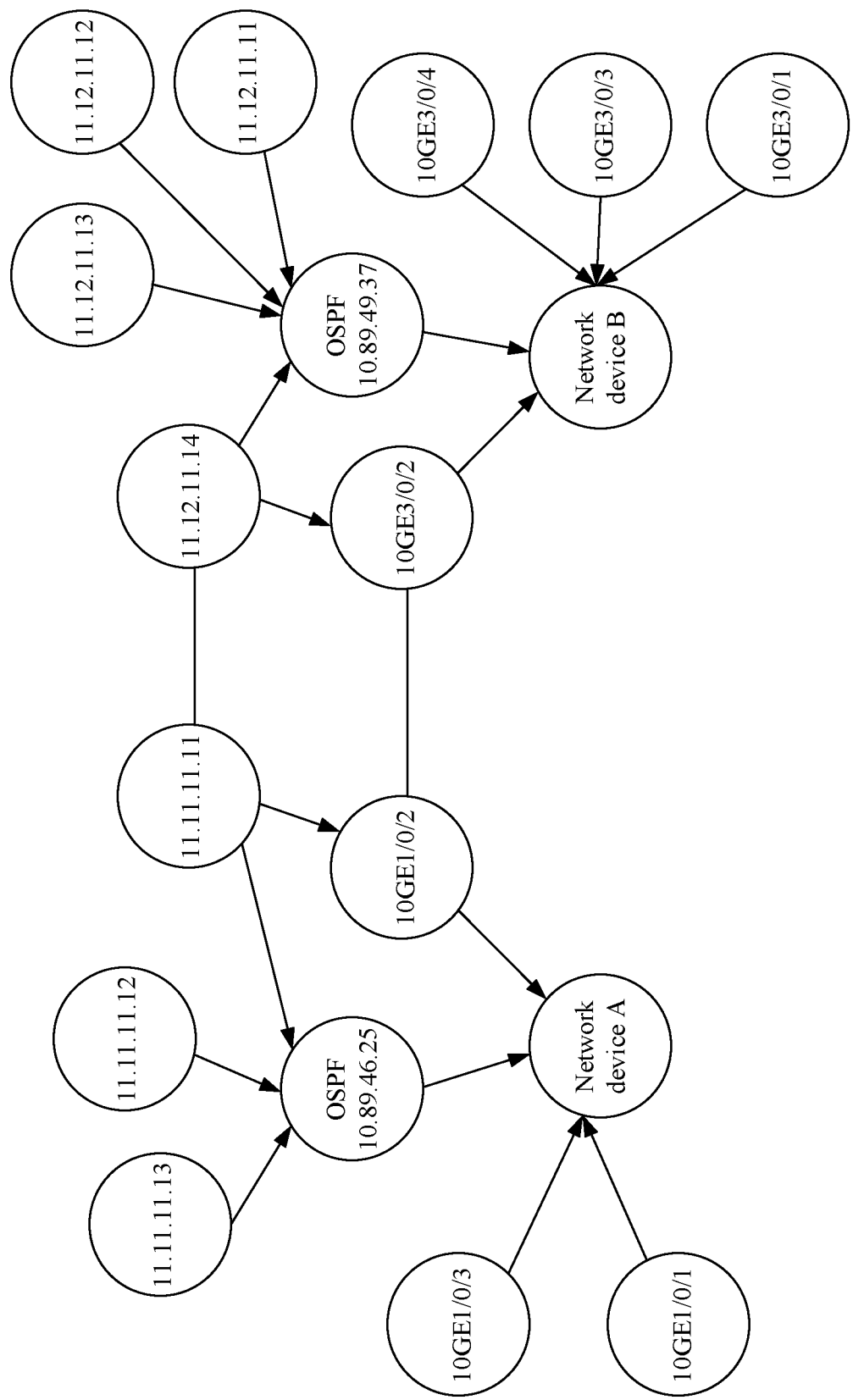
FIG. 3 is a schematic structural diagram of a knowledge graph according to an embodiment.
Figure 4:
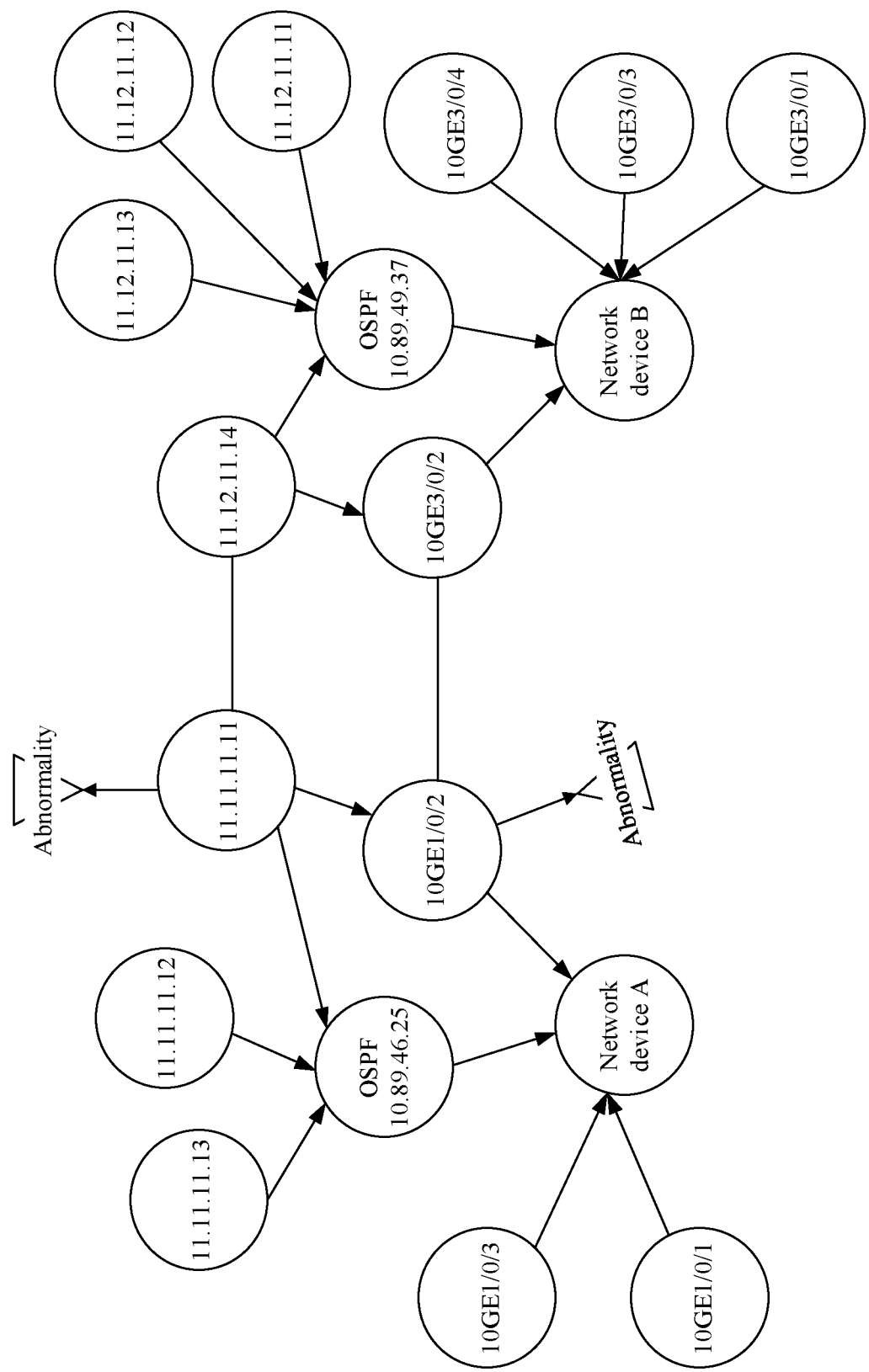
FIG. 4 is a schematic structural diagram of another knowledge graph according to an embodiment.

Further, if a fault occurs on the interface 10GE1/0/2 on the network device A, when a fault occurs in the target network because the route IP address 11.11.11.11 is unreachable, a network entity corresponding to the interface 10GE1/0/2 and a network entity corresponding to the route IP address 11.11.11.11 may be identified as an abnormal network entity on the initial knowledge graph shown in FIG. 3. Referring to FIG. 4, an abnormal event entity may be connected to the abnormal network entity, to identify the abnormal network entity. The abnormal event entity can be distinguished from the network entity by using a special figure or a special color. For example, referring to FIG. 4, a triangle may be used to represent the abnormal event entity. Optionally, a specific abnormal event may further be identified in the abnormal event entity, for example, a physical interface breakdown or an OSPF neighbor state change.

Figure 5:
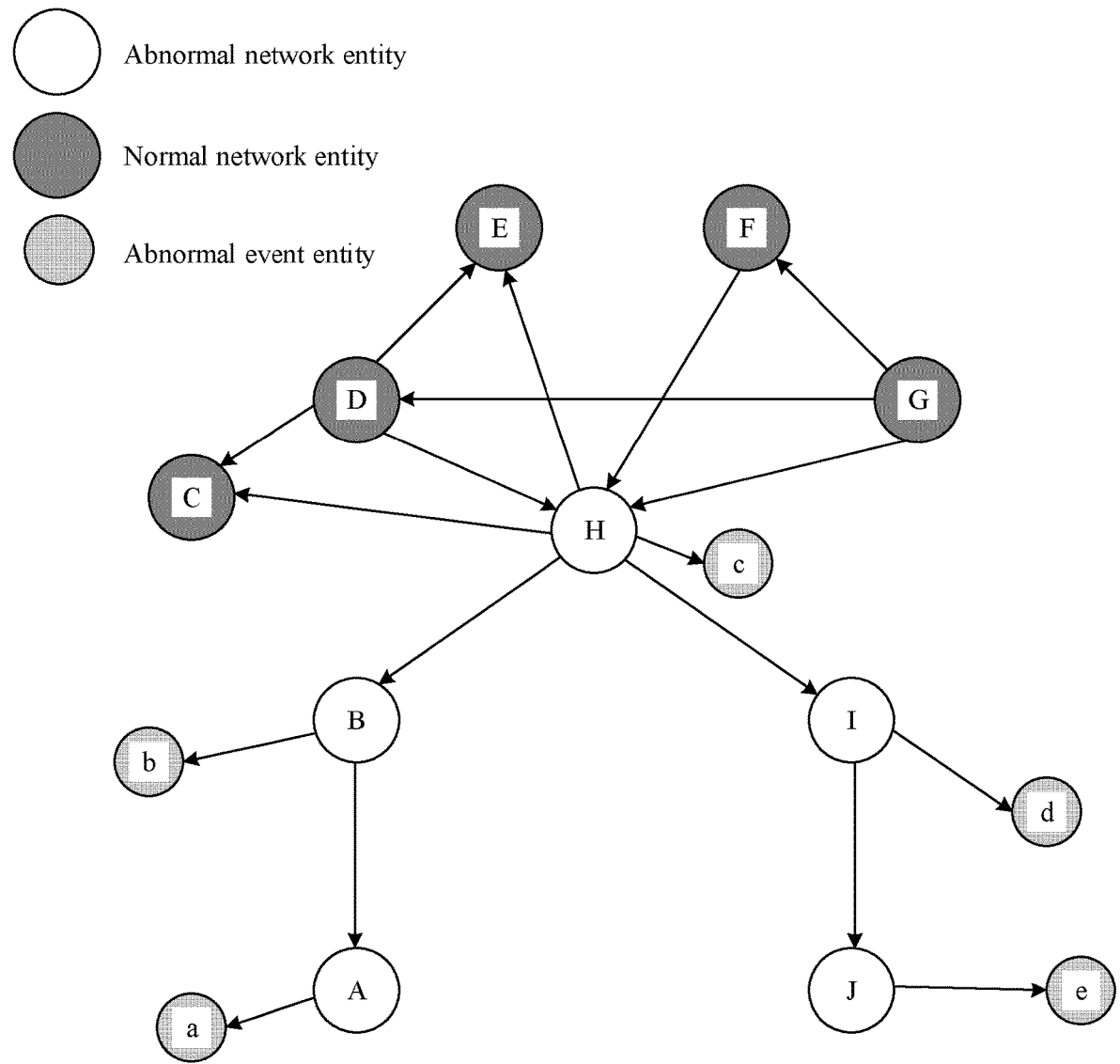
FIG. 5 is a schematic diagram of a knowledge graph of a target network in which a fault occurs according to an embodiment.

For example, FIG. 5 is a schematic diagram of a knowledge graph of a target network in which a fault occurs according to an embodiment. As shown in FIG. 5, the knowledge graph includes 10 network entities (network entities A-J) and 5 abnormal event entities (abnormal event entities a-e). The network entity A is connected to the abnormal event entity a, the network entity B is connected to the abnormal event entity b, the network entity H is connected to the abnormal event entity c, the network entity I is connected to the abnormal event entity d, and the network entity J is connected to the abnormal event entity e. In other words, the network entity A, the network entity B, the network entity H, the network entity I, and the network entity J are all abnormal network entities.

Step 202: Determine a fault feature of the target network based on the knowledge graph of the target network in which the fault occurs.

Optionally, the fault feature of the target network includes: a fault matching degree between the knowledge graph of the target network and a fault propagation relationship library, a neighbor network entity feature corresponding to each abnormal network entity on the knowledge graph of the target network, and/or a neighbor abnormal event entity feature corresponding to each abnormal event entity on the knowledge graph of the target network.

In the first case, when the fault feature of the target network includes the fault matching degree between the knowledge graph of the target network and the fault propagation relationship library, an implementation process of the step 202 includes: The management device determines the fault matching degree between the knowledge graph and the fault propagation relationship library based on the matching degree between the knowledge graph and each fault propagation relationship in the fault propagation relationship library. The matching degree between the knowledge graph and the fault propagation relationship may be a quantity of occurrences of the fault propagation relationship in the knowledge graph. Alternatively, the matching degree between the knowledge graph and the fault propagation relationship may also represent whether the fault propagation relationship matches the knowledge graph. If the fault propagation relationship occurs in the knowledge graph, it is determined that the fault propagation relationship matches the knowledge graph, and the matching degree between the knowledge graph and the fault propagation relationship is represented by a first value. If the fault propagation relationship does not occur in the knowledge graph, it is determined that the fault propagation relationship does not match the knowledge graph, and the matching degree between the knowledge graph and the fault propagation relationship is represented by a second value. The first value and the second value are different.

The fault matching degree between the knowledge graph and the fault propagation relationship library may include a set of matching degrees between the knowledge graph and all fault propagation relationships in the fault propagation relationship library. For example, the fault propagation relationship library includes a fault propagation relationship 1, a fault propagation relationship 2, and a fault propagation relationship 3. A quantity of occurrences of the fault propagation relationship 1 in the knowledge graph is 2, a quantity of occurrences of the fault propagation relationship 2 in the knowledge graph is 0, and a quantity of occurrences of the fault propagation relationship 3 in the knowledge graph is 1. In this case, the fault matching degree between knowledge graph and the fault propagation relationship library may be represented as {{fault propagation relationship 1; 2}, {fault propagation relationship 2; 0}, {fault propagation relationship 3; 1}}. Alternatively, the fault matching degree between the knowledge graph and the fault propagation relationship library may include a set of matching degrees between the knowledge graph and target fault propagation relationships in the fault propagation relationship library, and the matching degrees between the knowledge graph and the target fault propagation relationships are not 0. With reference to the foregoing example, the fault matching degree between the knowledge graph and the fault propagation relationship library may be represented as {{fault propagation relationship 1; 2}, {fault propagation relationship 3; 1}}.

In this embodiment, the fault propagation relationship may be represented by a text, or may be represented by a graph. For example, for a fault propagation relationship "OsNetwork-L3link-BGPpeer" in a text form, the fault propagation relationship is used to indicate that a protocol status fault of a neighbor in an OsNetwork causes an IP address of a BGP loopback interface is unreachable (L3link), and finally causes a BGP peer to be disconnected.

Optionally, the fault propagation relationship in the fault propagation relationship library may be manually determined, or may be learned by the management device based on a plurality of knowledge graph samples. The management device may obtain the plurality of knowledge graph samples, where each knowledge graph sample identifies, when a fault occurs in a network to which the knowledge graph sample belongs, all abnormal network entities that generate the abnormal event and a root cause faulty network entity in the network to which the knowledge graph sample belongs. The management device determines the fault propagation relationship based on the plurality of knowledge graph samples. Each knowledge graph sample is a fault case, and the abnormal network entity and the root cause faulty network entity in the knowledge graph sample are manually determined. Optionally, the management device may learn the fault propagation relationship in the plurality of knowledge graph samples according to a graph embedding algorithm or the like. Alternatively, when a probability that two network entities in a same knowledge graph triplet are abnormal at the same time is greater than a threshold, the management device may determine that fault propagation is performed between the two network entities.

For example, in a knowledge graph shown in FIG. 4, when a fault occurs on an interface 10GE1/0/2 of a network device A, the interface cannot perform normal communication, and a routing IP address 11.111.11.11 used on the interface is unreachable. Therefore, the management device can obtain a group of fault propagation relationships, to be specific, the interface fault causes the IP address on the interface to be unreachable.

Optionally, the network to which the knowledge graph sample belongs is the target network, or the network to which the knowledge graph sample belongs is another network whose network type is the same as that of the target network. The plurality of knowledge graph samples may belong to a same network, or may belong to a plurality of networks.

When the fault occurs on the target network, there are usually a plurality of abnormal network entities on the knowledge graph of the target network. The abnormal network entities may represent abnormality caused by the fault root cause, however, an actual fault root cause in the target network may not be an abnormal event corresponding to an abnormal network entity displayed on the knowledge graph. For example, when port congestion occurs in the network, abnormal events displayed on the knowledge graph include BGP protocol abnormality and OSPF protocol abnormality, but does not include root causes such as port congestion. For another example, when a layer 2 loop occurs in the network, abnormal events displayed on the knowledge graph include traffic burst on a plurality of interfaces, traffic storm suppression on a plurality of interfaces, and MAC address flapping on a plurality of interfaces, and the like, but does not include root causes such as the layer 2 loop. In addition, because the fault propagation relationship is used to indicate a fault propagation path between different network entities on the knowledge graph, the fault root cause of the target network may not be obtained through directly inference based on the fault propagation relationship in the fault propagation relationship library.

In this embodiment, the fault matching degree between the knowledge graph of the target network and the fault propagation relationship library is used to reflect a probability of the fault root cause of the target network that is obtained through direct inference based on the fault propagation relationship library. A higher matching degree between the knowledge graph of the target network and a fault propagation relationship in the fault propagation relationship library represents a higher probability of the fault root cause of the target network that is obtained through direct inference based on the fault propagation relationship.

Optionally, when the matching degree between the knowledge graph of the target network and each fault propagation relationship in the fault propagation relationship library is less than a matching degree threshold, the management device determines the fault root cause of the target network by using the fault root cause determining method provided in this embodiment. Otherwise, the management device determines the fault root cause of the target network based on the fault propagation relationship in the fault propagation relationship library.

In the second case, when the fault feature of the target network includes the neighbor network entity feature corresponding to each abnormal network entity on the knowledge graph of the target network, an implementation process of the step 202 includes: For each abnormal network entity on the knowledge graph, the management device obtains a neighbor network entity of the abnormal network entity, and obtains a neighbor network entity feature corresponding to the abnormal network entity.

The neighbor network entity of the abnormal network entity is a network entity directly connected to the abnormal network entity, in other words, a hop count between the abnormal network entity and the neighbor network entity of the abnormal network entity is equal to 1.

Optionally, a width parameter of graph searching is configured to be N, where N is a positive integer. The management device obtains, according to the width-first algorithm and with the abnormal network entity as a head node, N neighbor network entities of the abnormal network entity from the knowledge graph. When a quantity of neighbor network entities of the abnormal network entity is less than or equal to N, the management device obtains all neighbor network entities of the abnormal network entity. When the quantity of neighbor network entities of the abnormal network entity is greater than N, the management device randomly obtains the N neighbor network entities of the abnormal network entity. In order to ensure accuracy of the obtained neighbor network entity feature corresponding to the abnormal network entity, the width parameter N of the graph searching may be set to be large enough, so that the management device can obtain all neighbor network entities of each abnormal network entity.

For example, referring to a knowledge graph shown in FIG. 5, a neighbor network entity of an abnormal network entity A includes an abnormal network entity B. A neighbor network entity feature corresponding to the abnormal network entity A may be represented as {abnormal network entity A: {abnormal network entity B}}. Neighbor network entities of the abnormal network entity B include the abnormal network entity A and an abnormal network entity H. A neighbor network entity feature corresponding to the abnormal network entity B may be represented as {abnormal network entity B: {abnormal network entity A, abnormal network entity H}}. Neighbor network entities of the abnormal network entity H include the abnormal network entity B, a normal network entity C, a normal network entity D, a normal network entity E, a normal network entity F, a normal network entity G, and an abnormal network entity I. A neighbor network entity feature corresponding to the abnormal network entity H may be represented as: {abnormal network entity H: {abnormal network entity B, normal network entity C, normal network entity D, normal network entity E, normal network entity F, normal network entity G, abnormal network entity I}}. Neighbor network entities of the abnormal network entity I include the abnormal network entity H and the abnormal network entity J. A neighbor network entity feature corresponding to the abnormal network entity I may be represented as {abnormal network entity I: {abnormal network entity H, abnormal network entity J}}. A neighbor network entity of the abnormal network entity J includes the abnormal network entity I. A neighbor network entity feature corresponding to the abnormal network entity J may be represented as {abnormal network entity J: {abnormal network entity I}}. Certainly, a neighbor network entity feature corresponding to each abnormal network entity may also be represented by a graph.

In the third case, when the fault feature of the target network includes the neighbor abnormal event entity feature corresponding to each abnormal event entity on the knowledge graph of the target network, an implementation process of the step 202 includes: For each abnormal event entity on the knowledge graph, the management device obtains, from the knowledge graph, a path from the abnormal event entity to each target abnormal event entity, to obtain the neighbor abnormal event entity feature corresponding to the abnormal event entity. A hop count between the target abnormal event entity and the abnormal event entity is less than or equal to M, where M is a positive integer.

Optionally, a depth parameter of graph searching is configured to be M. The management device obtains, according to the depth-first algorithm and with the abnormal event entity as a head node, other abnormal event entities (namely, the target abnormal event entity) within a depth range M of the abnormal event entity on the knowledge graph.

For example, if M=3, referring to the knowledge graph shown in FIG. 5, with an abnormal event entity a as the head node, other abnormal event entities within the depth range M include an abnormal event entity b. A neighbor abnormal event entity feature corresponding to the abnormal event entity a may be represented as: {abnormal event entity a-abnormal network entity A-abnormal network entity B-abnormal event entity b}. With the abnormal event entity b as the head node, other abnormal event entities within the depth range M include the abnormal event entity a and the abnormal event entity c. A neighbor abnormal event entity feature corresponding to the abnormal event entity b may be represented as: {abnormal event entity b-abnormal network entity B-abnormal network entity A-abnormal event entity a; abnormal event entity b-abnormal network entity B-abnormal network entity H-abnormal event entity c}. With the abnormal event entity c as the head node, other abnormal event entities within the depth range M include the abnormal event entity b and the abnormal event entity d. A neighbor abnormal event entity feature corresponding to the abnormal event entity c may be represented as follows: {abnormal event entity c-abnormal network entity H-abnormal network entity B-abnormal event entity b; abnormal event entity c-abnormal network entity H-abnormal network entity I-abnormal event entity d}. With the abnormal event entity d as the head node, other abnormal event entities within the depth range M include the abnormal event entity c and the abnormal event entity e. A neighbor abnormal event entity feature corresponding to the abnormal event entity d may be represented as: {abnormal event entity d-abnormal network entity I-abnormal network entity H-abnormal event entity c; abnormal event entity d-abnormal network entity I-abnormal network entity J-abnormal event entity e}. With the abnormal event entity e as the head node, other abnormal event entities within the depth range M include the abnormal event entity d. A neighbor abnormal event entity feature corresponding to the abnormal event entity e may be represented as: {abnormal event entity e-abnormal network entity J-abnormal network entity I-abnormal event entity d}. Certainly, the neighbor abnormal event entity feature corresponding to each abnormal event entity may also be represented by a graph.

Step 203: Determine the fault root cause of the target network based on the fault feature of the target network.

Optionally, the management device inputs the fault feature of the target network into a fault root cause inference model, to obtain the fault root cause of the target network that is output by the fault root cause inference model based on the fault feature. The fault root cause inference model is obtained through training based on a plurality of knowledge graph samples of known fault root causes. Optionally, a process in which the management device obtains the fault root cause inference model includes:

Step 2031: The management device obtains the plurality of knowledge graph samples of the known fault root cause, where each of the knowledge graph samples identifies, when a fault occurs in a network to which the knowledge graph sample belongs, all abnormal network entities that generate abnormal events in the network to which the knowledge graph sample belongs and the abnormal event entity used to indicate the abnormal event generated by the abnormal network entity.

Optionally, each of the knowledge graph samples corresponds to a fault root cause. For example, for a schematic diagram of the knowledge graph sample, refer to FIG. 5.

Step 2032: The management device determines, based on the plurality of knowledge graph samples, a fault feature of the network to which each of the knowledge graph samples belongs.

Optionally, the fault feature of the network to which the knowledge graph sample belongs includes: a fault matching degree between the knowledge graph sample and the fault propagation relationship library, a neighbor network entity feature corresponding to each abnormal network entity on the knowledge graph sample, and/or a neighbor abnormal event entity feature corresponding to each abnormal event entity on the knowledge graph sample.

For each knowledge graph sample, the management device determines the fault matching degree between the knowledge graph sample and the fault propagation relationship library based on a matching degree between the knowledge graph sample and each fault propagation relationship in the fault propagation relationship library; and/or for each abnormal network entity on the knowledge graph sample, the management device obtains a neighbor network entity of the abnormal network entity to obtain a neighbor network entity feature corresponding to the abnormal network entity; and/or for each abnormal event entity on the knowledge graph sample, the management device obtains, from the knowledge graph sample, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer. For an implementation process in which the management device determines, based on the knowledge graph sample, the fault feature of the network to which the knowledge graph sample belongs, refer to an implementation process in which the management device determines the fault feature of the target network in the step 202.

Step 2033: The management device obtains the fault root cause inference model through training based on the fault feature of the network to which each of the knowledge graph samples belongs and the fault root cause corresponding to each of the knowledge graph samples.

The fault root cause inference model is essentially a data object that can reflect a correspondence between the fault feature of the network and the fault root cause of the network. In this embodiment, the management device performs, based on the fault features of the network to which the knowledge graph samples belong and the fault root cause (namely, a label) corresponding to each knowledge graph sample, a plurality of times of iterative training according to the supervised learning algorithm, to obtain the fault root cause inference model.

Optionally, the fault root cause inference model may alternatively be obtained through training by another device and then sent to the management device.

Optionally, after determining the fault root cause of the target network, the management device may send the fault root cause of the target network to an operation support system (OSS) or another terminal device connected to the management device for display by the OSS or the terminal device, so that an operation and maintenance personnel quickly obtain the fault root cause of the target network, to improve troubleshooting efficiency, in other words, to shorten a time period in which the network device is changed from a faulty state to a working state. The time period in which the network device is changed from the faulty state to the working state may also be referred to as mean time to repair (MTTR).

In this embodiment, the management device may include one or more devices. When the management device includes one device, all steps involved in the foregoing fault root cause determining method are performed by the device. Alternatively, when the management device includes a plurality of devices, for example, includes a first device, a second device, and a third device, the first device may generate the knowledge graph of the target network in which the fault occurs, and send the knowledge graph of the target network to the second device. The second device determines the fault feature of the target network based on the knowledge graph of the target network in which the fault occurs, and sends the fault feature of the target network to the third device. The third device determines the fault root cause of the target network based on the fault feature of the target network.

A sequence of the steps in the fault root cause determining method provided in this embodiment may be properly adjusted, and the steps may also be correspondingly increased or decreased based on a situation. Any variation readily figured out by persons skilled in the art within the technical scope disclosed shall fall within the protection scope of this disclosure.

In conclusion, in the fault root cause determining method provided in this embodiment, the fault feature of the network in which the fault occurs is determined based on the knowledge graph of the network in which the fault occurs. Because the knowledge graph is generated based on an entire network, and the obtained fault feature of the network is also based on the entire network, when the fault root cause of the network is determined based on the fault feature of the network in this embodiment, fault propagation between devices can be considered. This improves accuracy of determining the fault root cause in the network. In addition, the fault root cause inference model that is obtained through training based on the plurality of knowledge graph samples of the known fault root causes is used to determine the fault root cause of the network, to accurately determine the fault root cause in the network, and prevent an abnormality representation of the fault root cause in the network from being determined as the fault root cause, and further improve accuracy of determining the fault root cause in the network.

Figure 6:
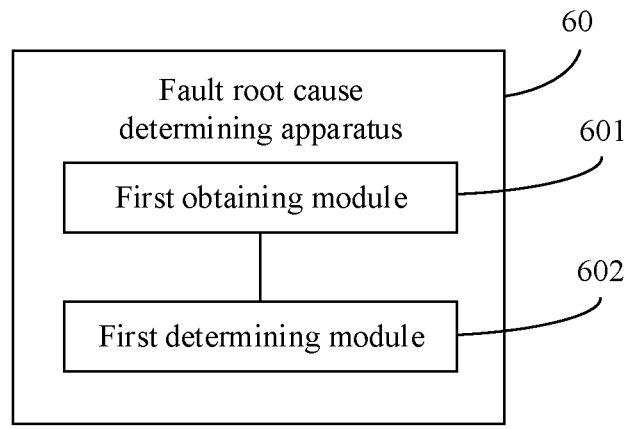
FIG. 6 is a schematic structural diagram of a fault root cause determining apparatus according to an embodiment.

FIG. 6 is a schematic structural diagram of a fault root cause determining apparatus according to an embodiment. The fault root cause determining apparatus may be applied to the management device 101 in the scenario shown in FIG. 1. As shown in FIG. 6, the apparatus 60 includes: a first obtaining module 601 configured to obtain a fault feature of a target network in which a fault occurs, where the fault feature is determined based on a knowledge graph of the target network in which the fault occurs, the knowledge graph includes a network entity and an abnormal event entity, the abnormal event entity is connected to an abnormal network entity, the abnormal network entity is a network entity that generates an abnormal event in the target network, the abnormal event entity is configured to indicate the abnormal event generated by the abnormal network entity, and a type of the network entity is a network device, an interface, a protocol, or a service; and a first determining module 602 configured to determine a fault root cause of the target network based on the fault feature.

In conclusion, in the fault root cause determining apparatus provided in this embodiment, the fault feature of the network in which the fault occurs is determined based on the knowledge graph of the network in which the fault occurs. Because the knowledge graph is generated based on an entire network, and the obtained fault feature of the network is also based on the entire network, when the fault root cause of the network is determined based on the fault feature of the network in this embodiment, fault propagation between devices can be considered. This improves accuracy of determining the fault root cause in the network.

Optionally, the first determining module is configured to input the fault feature into a fault root cause inference model, to obtain the fault root cause of the target network that is output by the fault root cause inference model based on the fault feature, where the fault root cause inference model is obtained through training based on a plurality of knowledge graph samples of known fault root causes.

Optionally, the first obtaining module is configured to obtain the knowledge graph of the target network in which the fault occurs, and determine the fault feature of the target network based on the knowledge graph.

Optionally, the first obtaining module is further configured to: determine a fault matching degree between the knowledge graph and a fault propagation relationship library based on a matching degree between the knowledge graph and each fault propagation relationship in the fault propagation relationship library; and/or for each abnormal network entity on the knowledge graph, obtain a neighbor network entity of the abnormal network entity, to obtain a neighbor network entity feature corresponding to the abnormal network entity; and/or for each abnormal event entity on the knowledge graph, obtain, from the knowledge graph, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer.

Figure 7:
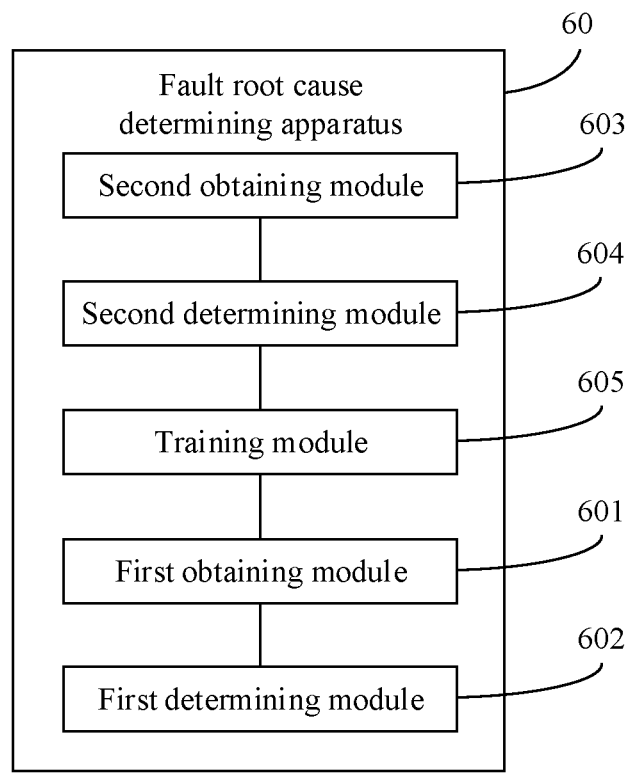
FIG. 7 is a schematic structural diagram of another fault root cause determining apparatus according to an embodiment.

Optionally, as shown in FIG. 7, the apparatus 60 further includes: a second obtaining module 603 configured to obtain the plurality of knowledge graph samples of the known fault root cause, where each of the knowledge graph samples identifies, when a fault occurs in a network to which the knowledge graph sample belongs, all abnormal network entities that generate abnormal events in the network to which the knowledge graph sample belongs and the abnormal event entity used to indicate the abnormal event generated by the abnormal network entity; a second determining module 604 configured to determine, based on the plurality of knowledge graph samples, a fault feature of the network to which each of the knowledge graph samples belongs; and a training module 605 configured to obtain a fault root cause inference model through training based on the fault feature of the network to which each of the knowledge graph samples belongs and a fault root cause corresponding to each of the knowledge graph samples.

Optionally, the second determining module is configured to: for each knowledge graph sample, determine a fault matching degree between the knowledge graph sample and the fault propagation relationship library based on a matching degree between the knowledge graph sample and each fault propagation relationship in the fault propagation relationship library; and/or for each abnormal network entity on the knowledge graph sample, obtain a neighbor network entity of the abnormal network entity to obtain a neighbor network entity feature corresponding to the abnormal network entity; and/or for each abnormal event entity on the knowledge graph sample, obtain, from the knowledge graph sample, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer.

Optionally, each of the knowledge graph samples corresponds to a fault root cause.

In conclusion, in the fault root cause determining apparatus provided in this embodiment, the fault feature of the network in which the fault occurs is determined based on the knowledge graph of the network in which the fault occurs. Because the knowledge graph is generated based on an entire network, and the obtained fault feature of the network is also based on the entire network, when the fault root cause of the network is determined based on the fault feature of the network in this embodiment, fault propagation between devices can be considered. This improves accuracy of determining the fault root cause in the network. In addition, the fault root cause inference model that is obtained through training based on the plurality of knowledge graph samples of the known fault root causes is used to determine the fault root cause of the network, to accurately determine the fault root cause in the network, and prevent an abnormality representation of the fault root cause in the network from being determined as the fault root cause, and further improve accuracy of determining the fault root cause in the network.

Figure 8:
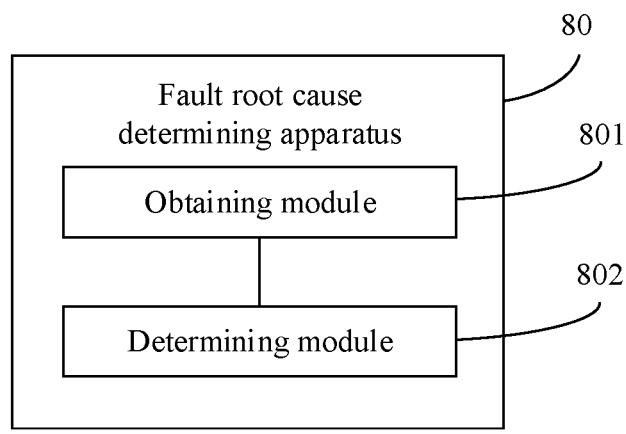
FIG. 8 is a schematic structural diagram of a fault root cause determining apparatus according to another embodiment.

FIG. 8 is a schematic structural diagram of a fault root cause determining apparatus according to another embodiment. The fault root cause determining apparatus may be applied to the management device 101 in the scenario shown in FIG. 1. As shown in FIG. 8, the apparatus 80 includes: an obtaining module 801 configured to obtain a knowledge graph of a target network in which a fault occurs, where the knowledge graph includes a network entity and an abnormal event entity, the abnormal event entity is connected to an abnormal network entity, the abnormal network entity is a network entity that generates an abnormal event in the target network, the abnormal event entity is configured to indicate the abnormal event generated by the abnormal network entity, and a type of the network entity is a network device, an interface, a protocol, or a service; and a determining module 802 configured to determine a fault feature of the target network based on the knowledge graph, where the fault feature is used to determine a fault root cause of the target network.

Optionally, the determining module is configured to: determine a fault matching degree between the knowledge graph and a fault propagation relationship library based on a matching degree between the knowledge graph and each fault propagation relationship in the fault propagation relationship library; and/or for each abnormal network entity on the knowledge graph, obtain a neighbor network entity of the abnormal network entity, to obtain a neighbor network entity feature corresponding to the abnormal network entity; and/or for each abnormal event entity on the knowledge graph, obtain, from the knowledge graph, a path from the abnormal event entity to each target abnormal event entity, to obtain a neighbor abnormal event entity feature corresponding to the abnormal event entity, where a hop count between the target abnormal event entity and the abnormal event entity is less than or equal to M, and M is a positive integer.

In conclusion, in the fault root cause determining apparatus provided in this embodiment, the fault feature of the network in which the fault occurs is determined based on the knowledge graph of the network in which the fault occurs. Because the knowledge graph is generated based on an entire network, and the obtained fault feature of the network is also based on the entire network, when the fault root cause of the network is determined based on the fault feature of the network in this embodiment, fault propagation between devices can be considered. This improves accuracy of determining the fault root cause in the network.

For the apparatus in the foregoing embodiment, specific manners of executing operations by each module are described in detail in the embodiments related to the method. Details are not described herein.

Figure 9:
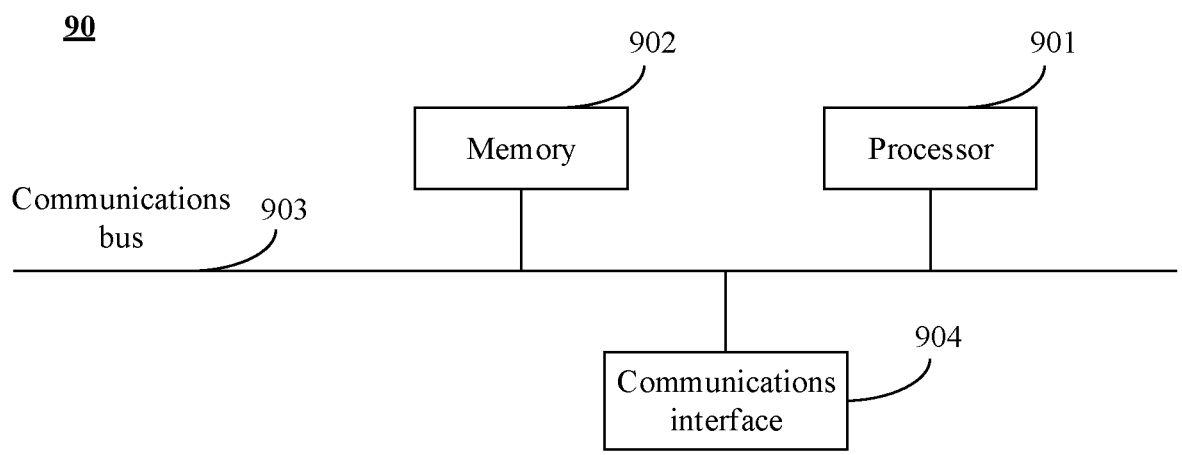
FIG. 9 is a block diagram of a fault root cause determining apparatus according to an embodiment.

FIG. 9 is a block diagram of a fault root cause determining apparatus according to an embodiment. The fault root cause determining apparatus may be a management device, and the management device may be a network controller, a network management device, a gateway, or another device having a control capability. As shown in FIG. 9, the management device 90 includes a processor 901 and a memory 902.

The memory 902 is configured to store a computer program, where the computer program includes a program instruction.

The processor 901 is configured to invoke the computer program to implement one or more steps in the fault root cause determining method shown in FIG. 2.

Optionally, the management device 90 further includes a communications bus 903 and a communications interface 904.

The processor 901 includes one or more processing cores, and the processor 901 executes various function applications and data processing by running the computer program.

The memory 902 may be configured to store the computer program. Optionally, the memory may store an operating system and an application program unit required by at least one function. The operating system may be an operating system such as a real-time operating system (Real Time eXecutive, RTX), LINUX, UNIX, WINDOWS, or OS X.

There may be a plurality of communications interfaces 904, and the communications interfaces 904 are configured to communicate with another storage device or network device, for example, communicate with a control device or a network device.

The memory 902 and the communications interface 904 are separately connected to the processor 901 by using the communications bus 903.

An embodiment further provides a computer storage medium. The computer storage medium stores an instruction. When the instruction is executed by a processor, the fault root cause determining method shown in FIG. 2 is implemented.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

In the embodiments, the terms "first", "second", and "third" are merely used for a purpose of description, and shall not be understood as an indication or implication of relative importance.

The term "and/or" describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments, but are not intended to limit this disclosure. Any modification, equivalent replacement, or improvement made without departing from the concept and principle of this disclosure should fall within the protection scope of this disclosure.

What is claimed is:

1. A method implemented by a management device and comprising:
   obtaining a knowledge graph of a target communication network in which a fault occurs, wherein the target communication network comprises the management device and network devices, wherein the knowledge graph comprises a network entity and an abnormal event entity, wherein the abnormal event entity is connected to an abnormal network entity associated with an abnormal event in the target communication network, and wherein a type of the network entity is a network device, an interface, a protocol, or a service;
   determining a fault matching degree between the knowledge graph and a fault propagation relationship library based on a matching degree between the knowledge graph and each fault propagation relationship in the fault propagation relationship library;
   obtaining a fault feature of the target communication network based on the fault matching degree; and
   determining a fault root cause of the target communication network based on the fault feature.

2. The method of claim 1, further comprising inputting the fault feature into a fault root cause inference model to obtain the fault root cause, wherein the fault root cause inference model is based on training with a plurality of knowledge graph samples of known fault root causes.

3. The method of claim 1, further comprising, obtaining, for each abnormal network entity on the knowledge graph, a neighbor network entity of the abnormal network entity to obtain a neighbor network entity feature corresponding to the abnormal network entity.

4. The method of claim 1, further comprising obtaining, from the knowledge graph and for each abnormal event entity on the knowledge graph, a path from the abnormal event entity to each target abnormal event entity to obtain a neighbor abnormal event entity feature corresponding to the abnormal event entity.

5. The method of claim 1, further comprising:
   obtaining knowledge graph samples of known fault root causes, wherein each of the knowledge graph samples identifies, when a fault occurs in a network to which the knowledge graph sample belongs, all abnormal network entities that generate abnormal events in the network and the abnormal event entity used to indicate the abnormal events;
   determining, based on the knowledge graph samples, a fault feature of the network; and
   obtaining a fault root cause inference model through training based on the fault feature of the network and a fault root cause corresponding to each of the knowledge graph samples.

6. The method of claim 5, further comprising:
   determining, for each of the knowledge graph samples, a fault matching degree between the knowledge graph sample and a fault propagation relationship library based on a matching degree between the knowledge graph sample and each fault propagation relationship in the fault propagation relationship library;
   obtaining, for each abnormal network entity on the knowledge graph sample, a neighbor network entity of the abnormal network entity to obtain a neighbor network entity feature corresponding to the abnormal network entity; or
   obtaining, from the knowledge graph sample and for each abnormal event entity on the knowledge graph sample, a path from the abnormal event entity to each target abnormal event entity to obtain a neighbor abnormal event entity feature corresponding to the abnormal event entity.

7. The method of claim 5, wherein each of the knowledge graph samples corresponds to a fault root cause.

8. A management device comprising:
   a memory configured to store a computer program; and
   a processor coupled to the memory and configured to execute the computer program to cause the management device to:
   obtain a knowledge graph of a target communication network in which a fault occurs, wherein the target communication network comprises the management device and network devices, wherein the knowledge graph comprises a network entity and an abnormal event entity, wherein the abnormal event entity is connected to an abnormal network entity, associated with an abnormal event in the target communication network, and wherein a type of the network entity is a network device, an interface, a protocol, or a service;
   determine a fault matching degree between the knowledge graph and a fault propagation relationship library based on a matching degree between the knowledge graph and each fault propagation relationship in the fault propagation relationship library;

obtain a fault feature of the target communication network based on the fault matching degree; and determine a fault root cause of the target communication network based on the fault feature.

9. The management device of claim 8, wherein the processor is further configured to execute the computer program to cause the management device to input the fault feature into a fault root cause inference model to obtain the fault root cause, and wherein the fault root cause inference model is based on training with a plurality of knowledge graph samples of known fault root causes.

10. The management device of claim 8, wherein the processor is further configured to obtain, for each abnormal network entity on the knowledge graph, a neighbor network entity of the abnormal network entity to obtain a neighbor network entity feature corresponding to the abnormal network entity.

11. The management device of claim 8, wherein the processor is further configured to execute the computer program to cause the management device to obtain, from the knowledge graph and for each abnormal event entity on the knowledge graph, a path from the abnormal event entity to each target abnormal event entity to obtain a neighbor abnormal event entity feature corresponding to the abnormal event entity.

12. The management device of claim 8, wherein the processor is further configured to execute the computer program to cause the management device to:
obtaining knowledge graph samples of known fault root causes, wherein each of the knowledge graph samples identifies, when a fault occurs in a network to which the knowledge graph sample belongs, all abnormal network entities that generate abnormal events in the network and the abnormal event entity used to indicate the abnormal events;
determining, based on the knowledge graph samples, a fault feature of the network; and
obtaining a fault root cause inference model through training based on the fault feature of the network and a fault root cause corresponding to each of the knowledge graph samples.

13. The management device of claim 12, wherein the processor is further configured to execute the computer program to cause the management device to:
determine, for each of the knowledge graph samples, a fault matching degree between the knowledge graph sample and a fault propagation relationship library based on a matching degree between the knowledge graph sample and each fault propagation relationship in the fault propagation relationship library;
obtain, for each abnormal network entity on the knowledge graph sample, a neighbor network entity of the abnormal network entity to obtain a neighbor network entity feature corresponding to the abnormal network entity; or
obtain, from the knowledge graph sample and for each abnormal event entity on the knowledge graph sample, a path from the abnormal event entity to each target abnormal event entity to obtain a neighbor abnormal event entity feature corresponding to the abnormal event entity.

14. The management device of claim 12, wherein each of the knowledge graph samples corresponds to a fault root cause.

15. The management device of claim 8, wherein the processor is further configured to execute the computer program to cause the management device to send, after determining the fault root cause, the fault root cause to another network entity for displaying the fault root cause on the another network entity.

16. The management device of claim 15, wherein the other network entity comprises an operation support system (OSS).

17. The method of claim 1, further comprising obtaining device information of the network devices to generate the knowledge graph.

18. The method of claim 17, wherein the device information comprises network configuration information or a routing entry.

19. The method of claim 1, further comprising sending, after determining the fault root cause, the fault root cause to another network entity for displaying the fault root cause on the another network entity.

20. The method of claim 19, wherein the other network device comprises a terminal device.

21. A computer program product comprising instructions that are stored on a computer-readable medium and that, when executed by a processor, cause a management device to:
obtain a knowledge graph of a target communication network in which a fault occurs, wherein the target communication network comprises the management device and network devices, wherein the knowledge graph comprises a network entity and an abnormal event entity, wherein the abnormal event entity is connected to an abnormal network entity, associated with an abnormal event in the target communication network, and wherein a type of the network entity is a network device, an interface, a protocol, or a service;
determine a fault matching degree between the knowledge graph and a fault propagation relationship library based on a matching degree between the knowledge graph and each fault propagation relationship in the fault propagation relationship library;
obtain a fault feature of the target communication network based on the fault matching degree; and
determine a fault root cause of the target communication network based on the fault feature.

22. The computer program product of claim 21, wherein the instructions, when executed by the processor, further cause the management device to send, after determining the fault root cause, the fault root cause to another network entity for displaying the fault root cause on the another network entity.

23. The computer program product of claim 21, wherein the instructions, when executed by the processor, further cause the management device to input the fault feature into a fault root cause inference model to obtain the fault root cause, wherein the fault root cause inference model is based on training with a plurality of knowledge graph samples of known fault root causes.

* * * * *